Dec. 21, 1948. P. C. KEITH 2,456,707
PROCESS FOR STRIPPING SPENT FLUID CATALYSTS
Filed Aug. 17, 1944 2 Sheets-Sheet 2
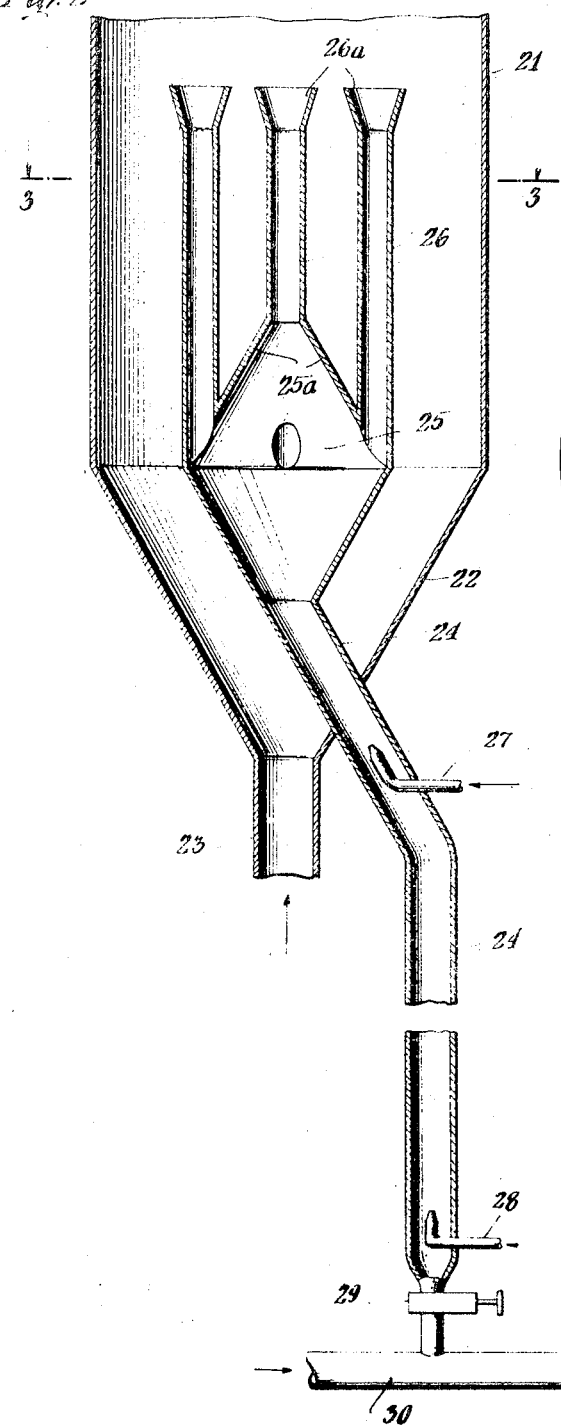
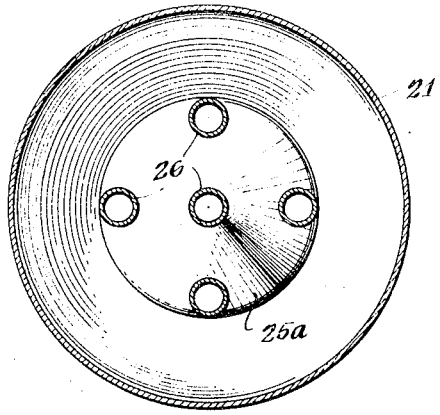
INVENTOR.
Percival C Keith Patented Dec. 21, 1948

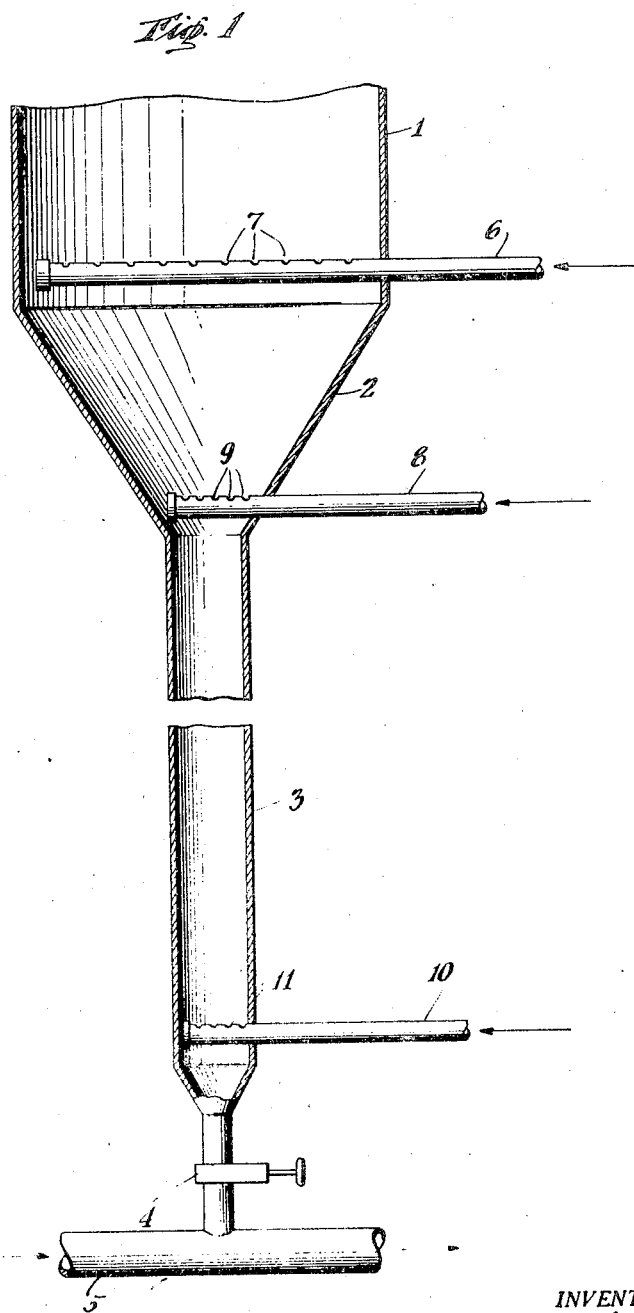

2,456,707

UNITED STATES PATENT OFFICE 2,456,707

PROCESS FOR STRIPPING SPENT FLUID CATALYSTS

Percival C. Keith, Peapack, N. J., assignor to Hydrocarbon Research, Inc., New York, N. Y.

Application August 17, 1944, Serial No. 549,947

11 Claims. (Cl. 196—52)

The present invention relates to the stripping of hydrocarbons from spent comminuted catalysts used in hydrocarbon conversion processes. More particularly, the invention pertains to the stripping of hydrocarbons from finely divided catalyst of the type which is contacted with hydrocarbon vapors under conditions that promote hydrocarbon conversion and maintain the catalyst in a fluid, agitated state, much resembling a boiling liquid.

In recent years, the technique of effecting catalytic reactions by the passage of reactant gases or vapors through a bed of finely divided catalyst at such velocities that the powder becomes suspended in the gas but exhibits what has been termed "hindered settling," has been developed rapidly and extensively for petroleum processing. This technique of fluidization, as it is commonly called, which keeps a mass of powdered material in a vibratory state resembling a boiling liquid and which permits the establishment of a pseudo-liquid level between the fluidized mass and the gas space above it, is the basis of the "fluid catalyst" process which has attained prominence in the manufacture of aviation gasoline.

The fluid catalyst process has been widely publicized, e. g., in Industrial and Engineering Chemistry, pages 768 to 773, July 1943. A fluid cracking plant comprises two major elements, a reactor and a regenerator. The remainder of the plant is largely composed of standpipes, cyclones, hoppers, pipes, blowers, etc., which are used to interconnect the reactor and regenerator and to maintain circulatory flow of the fluid catalyst through these units. The fluid system described in this article involves the transfer of powdered catalyst from both the reactor and the regenerator entirely by overhead entrainment. More recently, because of technical advantages, there has been growing preference for a fluid system in which the powdered catalyst leaves the reactor and regenerator predominantly through a bottom draw-off conduit, like a liquid draining from a tank. It may be of interest to note that Thomas shows in U. S. Patent 2,304,128, a fluid reactor with converting and regenerating zones disposed one vertically above the other. This is a combination system since Thomas proposes to transfer catalyst from the lower to the upper zone by overhead entrainment and from the upper to the lower zone by bottom draw-off.

In all of these systems, from an economic point of view, considerable attention must be given to the stripping of valuable hydrocarbons from spent catalyst particles if their wasteful combustion in the regeneration zone is to be avoided. Several proposals have been made to use inert gases, recycle gases and steam; the last is most widely used in the present large-scale operations. Steam has the advantage of being easily handled and readily separated from the hydrocarbons in the recovery system. However, even with steam, there are processing limitations which prevent complete or efficient stripping of hydrocarbons from spent catalyst. Steam is a relatively poor medium for conveying the heat which is required in vaporizing or stripping high-boiling hydrocarbons from fouled catalyst. Most catalysts, particularly the improved synthetic silica-alumina contact masses, are steam sensitive so that one is inhibited from using large excesses of steam to improve stripping if catalytic activity is not to suffer appreciably. Furthermore, as a practical matter, steam is generally not available at the elevated temperatures, say 800° to 1100° F., of the contact mass, so that the introduction of steam of lower temperature results in the chilling of the stripping zone and this is, of course, at cross purposes with the prime object of stripping steam. While latent heat of vaporization for stripping hydrocarbons may be supplied by abstracting heat from the catalyst, the temperature of the catalyst will necessarily be lowered with the result that stripping is made more difficult.

Inefficient stripping has a dual detrimental effect: the yield of valuable hydrocarbons is lowered and the load on the regenerator is increased. The latter disadvantage means that for a given burning or regenerating rate, the size of the regenerator will be larger as the stripping is less complete. Any stripping process which succeeds in decreasing the loss of absorbed hydrocarbons and/or in diminishing the load on the regenerator is commercially important in view of the enormous tonnage of fluid catalyst which is daily circulated between converters and regenerators.

A principal object of my invention is to strip hydrocarbons from spent catalyst powders in an effective and simple manner.

Another principal object is to conduct the stripping of hydrocarbons in a manner which results in a diminution of the burning load placed on the regenerator.

Another object is to avoid or minimize the deactivation of comminuted catalyst during the stripping operation.

Still another object of the invention is not only to obviate chilling of the catalyst mass undergoing stripping but also to raise the stripping temperature by generating heat within the catalyst mass.

A further and important object is to strip fouled catalyst exothermically and to make the exothermic energy available to the conversion reaction.

These and other objects of my invention will be apparent from the description which follows.

According to my invention, a gas containing not less than about 35% by volume of oxygen, and preferably not less than 95% oxygen, is used in controlled amount to remove hydrocarbons from spent, comminuted catalyst, while maintaining the catalyst in a fluidized condition. The stripping is conducted by introducing the oxygen-containing gas into the fluid catalyst mass in the hoppers and standpipes which feed the catalyst to the regenerator. In the favored fluid systems with bottom draw-off of catalyst, displacement of hydrocarbons from fouled catalyst is also carried out by introducing the oxygen-containing gas into the converter in the vicinity of the bottom draw-off opening. In all cases, the oxygen functions by burning a limited portion of the hydrocarbons, hydrogen and carbon carried along with the spent catalyst flowing from the conversion zone. The combustion not only elevates the temperature to promote better stripping but also forms a stripping or displacing atmosphere comprising carbon dioxide, carbon monoxide and steam ($H_2O$). Under the usual reaction conditions, say around 1000° F., this stripping atmosphere is largely carbon dioxide and carbon monoxide in the approximate ratio of 2 to 1. Besides relative inertness, these gases do not present any condensation problems and are still readily separable from hydrocarbons. They may even be recovered and utilized, for example, in the manufacture of hydrogen and of dry ice. Where the conversion process yields considerable amounts of hydrogen, the oxides of carbon may be reacted with the hydrogen to synthesize such products as alcohols and hydrocarbons. I carry on my stripping operation under fluidizing conditions.

To facilitate understanding of the process of my invention, reference is made to the drawings attached to this specification, of which:

Figure 1 is a vertical sectional representation of the embodiment of my invention in a fluid system wherein the catalytic converter is operated with bottom draw-off of the catalyst mass;

Figure 2 is a vertical sectional representation of another embodiment of the invention, involving a converter with a variant of bottom draw-off for the withdrawal of catalyst powder; and Figure 3 is a horizontal sectional view taken on line 3—3 of Figure 2.

Figure 1 shows the lower portion of a fluid catalyst reactor 1 with a tapered bottom section 2 discharging into standpipe 3. The mass of fluid powdered catalyst moves down through the reactor 1 into standpipe 3 and thence through slide valve 4 which controls the flow of catalyst into conduit 5 (shown partially). Catalyst dropping into conduit 5 is picked up and carried away in suspension by a stream of air or other suitable gas flowing therethrough. The transport of catalyst to the regenerator by suspension in a carrier gas is conventional procedure. Hydrocarbon vapors flow into distributor 6 and through openings 7 into the lower portion of the reactor 1 where they undergo conversion by contacting the fluid mass of catalyst. Regenerated catalyst may be charged into reactor 1 by carrying it in suspension in the hydrocarbon feed entering through distributor 6 or equivalent means. Alternatively, the catalyst may be fed through a hopper and standpipe discharging into reactor 1 below the pseudo-liquid level of the fluidized catalyst mass. A Fuller-Kinyon pump is another device which may be employed to return regenerated catalyst to reactor 1. Below distributor 6, another distributor 8, disposed near the base of tapered section 2, is used for the introduction of oxygen-containing gas which contacts the fouled catalyst on escaping through openings 9. Similarly, in the vicinity of the bottom of standpipe 3, oxygen-containing gas enters distributor 10 and flows through openings 11. The oxygen-containing gas flowing upward from openings 9 and 11 contacts hot spent catalyst, and functions not only to fluidize the powdered catalyst but also to strip hydrocarbons therefrom. It is preferable to preheat the oxygen-containing stripping gas. Inasmuch as hydrocarbon conversions are carried out at elevated temperatures, usually in excess of about 800° F., the oxygen in the stripping gas reacts with some of the carbonaceous matter enveloping the catalyst particles which are at such elevated temperatures as they discharge from a conversion zone; hydrogen and low-boiling hydrocarbons which are part of the carbonaceous envelope seem to burn in preference to the more valuable and higher-boiling hydrocarbons. This oxidation reaction is exothermic and yields a mixture of carbon dioxide, carbon monoxide and steam. The oxygen-containing gas not only produces a satisfactory stripping atmosphere but also generates heat in the region where it is most beneficial for effective stripping.

The temperature, however, is regulated to prevent deactivation or injury of the catalyst. Such temperature regulation may be achieved by controlling the rate at which the oxygen-containing gas is brought into contact with the catalyst which is to be stripped of absorbed hydrocarbons. Where the catalyst flows down from the reactor or converter into a standpipe through which the oxygen-containing stripping gas is passed in countercurrent flow relation to the discharging catalyst, it is advisable to control the rate of downward flow of catalyst and upward flow of gas to effect substantially complete stripping of the catalyst and substantially complete consumption of the oxygen in the gas before the gas reaches the conversion zone. In cases where the stripping of the absorbed hydrocarbons from the fouled catalyst by the process of this invention generates too much heat for convenient regulation through flow rates, a coolant may be circulated in indirect heat exchange relation with the catalyst undergoing stripping so as to maintain the catalyst at a temperature below its deactivation temperature.

I consider the above-described arrangement a preferred embodiment of my invention because any oxygen which is incompletely utilized in the stripping zone naturally flows upward into the cracking or conversion zone of the reactor. The oxygen, of course, reacts with some of the combustible material in the conversion zone and thereby supplies heat to the conversion which is endothermic. The increase in temperature in the conversion zone because of regulated combustion with oxygen, besides being desirable per se for the endothermic reaction diminishes the formation of carbonaceous matter around the catalyst particles. Thus, a dual improvement is realized because diminished formation of carbonaceous matter leads to a more desirable distribution of hydrocarbon products and a decrease in the burning load of the regenerator. This controlled use of oxygen in relatively high concentration within the conversion zone does not sensibly affect the yield of the more valuable hydrocarbons adversely since there appears to be a preferential reaction between the oxygen and the catalyst envelope of carbonaceous matter, including hydrogen and low-boiling hydrocarbons. The resultant carbon dioxide, carbon monoxide and steam in the conversion products present no difficulty and, as previously indicated, they are readily separable from the hydrocarbon products.

The use of oxygen for stripping hydrocarbons from fouled catalyst is also applicable to fluid systems which employ overhead entrainment. In such cases, the spent catalyst is separated from the reaction gases by cyclone separators, Cottrell precipitators and the like, and is dropped into hoppers connected with suitable standpipes to the remainder of the fluid plant. The representation of a hopper and standpipe containing spent catalyst that is flowing to a regenerator is similar to that of Figure 1. The only exception is that distributor 6 for the introduction of hydrocarbon vapors is omitted. The stripping of hydrocarbons from spent catalyst in such a hopper and standpipe by the method of my invention is the same as described hereinabove for a reactor with a bottom draw-off for catalyst. The oxygen-containing stripping gas is introduced through distributors 8 and 10 to maintain the spent powdered catalyst in a fluid state and to strip hydrocarbons therefrom exothermically. The rate at which oxygen is introduced is controlled so that the temperature of the fluidized catalyst mass is kept below the deactivation temperature, usually about 1100° F., of the catalyst. There is advantage in an alternative procedure of using an excess of oxygen and of maintaining the temperature below the catalyst deactivation point by ciculating a coolant like water through jackets surrounding the standpipe and hopper and/or through coils or tubes within the fluid mass of catalyst to remove the excess heat generated by the stripping operation. This arrangement makes it possible to extend the stripping operation to the stage of preliminary or partial regeneration of the catalyst. Thus, hydrocarbons can be stripped from spent catalyst within hopper 1 by oxygen-containing gas fed through distributor 8 and by the hot gases rising up from standpipe 3. As the stripped catalyst flows down into standpipe 3, it contacts oxygen-containing gas ascending from distributor 10. During this contact, part of the carbon residue on the stripped catalyst is burned off so that the ultimate burning load of the regenerator is further reduced. Stated with another point of view, the overall regeneration capacity of the fluid catalyst plant is increased by initiating regeneration in the course of transporting the catalyst to the regenerator. This alternative procedure of using an excess of oxygen together with cooling is also applicable to the first cited example of a reactor with a bottom draw-off. In such case, the stripping would be carried out in the tapered section 2 of reactor 1 and, perhaps, in the upper portion of standpipe 3, while preliminary regeneration of the stripped catalyst would be conducted in the lower portion of standpipe 3. Referring again to a hopper and standpipe used to feed spent catalyst to a regenerator, the gases resulting from the stripping operation, which perhaps includes partial regeneration, do not perforce become mixed with the hydrocarbon vapors flowing through the cyclone separator which is connected to the hopper. The solids thrown down by the separator usually discharge from the separator into the hopper by way of a conduit which is kept full of solids and thus acts as a gas seal. Other gas seals, like rotary-bucket valves, may be interposed between the separator and the hopper. Accordingly, the gases resulting from the stripping operation may be withdrawn without admixing them with the hydrocarbon vapors from the conversion zone. These gases are then passed through conventional cooling and separating equipment to recover the stripped hydrocarbons. The residual gas which has substantial proportions of carbon monoxide and dioxide is commercially utilizable as hereinbefore mentioned. Also, some of the residual gas can be recycled to the stripping zone as part of the oxygen-containing stripping gas.

Figure 2 presents the lower portion of a fluid catalyst converter 21 with a tapered bottom 22 and an inlet pipe 23. Hydrocarbon vapors carrying regenerated catalyst in suspension enter converter 21 through inlet 23. Because of the decrease in velocity as the vapors flow from pipe 23 into converter 21, the catalyst powder undergoes "hindered settling." Thus, a relatively dense mass of catalyst is formed in converter 21. The mass is maintained in a fluidized state by vaporized hydrocarbons which are passed therethrough and are thereby converted to desired products. Below the pseudo-liquid level, the region in which the hydrocarbon vapors become disengaged from the bulk of the catalyst, there is a draw-off standpipe 24 with a header 25 in which are set several drain tubes 26. The plate 25a to which tubes 26 are fastened is sloped beyond the angle of repose of the catalyst powder so as to prevent the accumulation of powder on plate 25a. Tubes 26 have enlarged mouths 26a. In the course of the hydrocarbon conversion, the catalyst becomes spent by the formation of carbonaceous matter on its surfaces. Spent catalyst overflows from the reaction zone of converter 21 into mouths 26a and thence travels down through tubes 26, header 25 and standpipe 24, in sequence. As the spent catalyst moves downward, it encounters a rising stream of oxygen-containing gas which is fed into standpipe 24 through aeration tubes 27 and 28. The oxygen-containing gas not only keeps the spent catalyst in a fluid condition but also strips hydrocarbons from the catalyst exothermically. As in previous examples, the rate at which oxygen is introduced is controlled so that the temperature does not reach the point where the catalyst is deactivated or injured. Heat developed within header 25 and tubes 26 is available to the surrounding endothermic reaction mass by thermal conductivity. These parts may be constructed of thermally resistant steels or other alloys to facilitate the transfer of exothermic energy from the stripping zone to the reaction zone. The operation of a fluid catalyst converter with this novel variant of catalyst draw-off gives the same advantages that are realized with the reactor of Figure 1 and, in addition, permits more heat to reach the surrounding endothermic reaction mass because of its generation in a thermally conductive container within the mass rather than in an external standpipe. If it is desired to perform partial regeneration of the stripped catalyst, an excess of oxygen may be introduced through aeration tube 28 and the portion of standpipe 24 which is outside of converter 21 may have a cooling jacket or tubes to regulate the combustion temperature. A slide valve 29 or an equivalent device like a star feeder is used to control the withdrawal of stripped catalyst from standpipe 24. The catalyst discharges into conduit 30 through which it is conveyed by a carrier gas, such as oxygen-enriched air, to the regenerator.

My invention is applicable to such fluid catalyst conversions as cracking, hydroforming, dehydrogeneration, desulfurization, isoforming, aromaticization, and the like. All of these reactions are characterized by the deposition on the catalyst of carbon or carbonaceous matter which is removed by oxidation to revivify the catalyst. Suitable hydrocarbon feeds for these conversion processes include crude petroleum, gas oil, naphtha, shale oil, synthetic oil from a Fischer-type process, and tar from low-temperature carbonization of coal.

Hydrocarbon conversion processes utilize a wide variety of catalysts or contact agents. Typical materials are activated clays, silica gel promoted with alumina, molybdenum oxide on activated alumina, and supported chromium oxide. In fact, inasmuch as catalysis is still not clearly understood or definable, a suitable contact agent is any material which will permit the desired conversion of hydrocarbons. Accordingly, references throughout this specification and the appended claims to catalysts shall be interpreted broadly as contact agents which under chosen conditions serve to bring about desired hydrocarbon conversions.

While the flow of hydrocarbon vapors through a fluid conversion zone is generally at a velocity of the order of at least 1 foot per second, I usually introduce my stripping gas containing not less than about 35% by volume of oxygen at a velocity of the order of 0.3 foot per second, or even of the order 0.01 foot per second. While these aeration velocities are generally satisfactory, it is well to repeat that, in the final analysis, the rate of oxygen introduction is largely dependent upon and controlled in accordance with the several attendant conditions of the particular conversion process involved. Inasmuch as catalysts used in hydrocarbon conversions lose their activity when subjected to temperatures above certain maxima, the rate of oxygen feed should be such that these temperature limitations are not exceeded. For example, when activated clays are used, the upper temperature limit is usually about 1100° F., while with synthetic silica-alumina type catalyst, it is possible to approach a temperature of about 1300° F. Alumina-chromia and alumina-molybdena type catalysts, used in reforming processes, permit temperatures not exceeding about 1350° F. These controlling temperature limitations on the use of oxygen both in standpipes and in the bases of reactors or hoppers dictate maximum rates at which oxygen may be introduced to strip hydrocarbons from spent fluid catalysts. However, as described hereinbefore, these maximum feed rates of oxygen may be exceeded if means are provided for removing the resulting excess heat so that the catalysts are not thermally injured. Suitable means have been suggested in the form of cooling jackets and tubes or, as shown in Figure 2, in the form of a stripping zone which is in heat exchange relation with an endothermic reaction zone. As is often done in the petroleum industry, the hydrocarbon feed may be introduced into the reaction zone in the form of heated liquid which flashes to vapor upon contacting the hot fluid catalyst. Accordingly, the type of stripping zone shown in Figure 2 may supply the heat of vaporization to the hydrocarbon feed injected into the reaction zone or, conversely stated, this type of stripping zone may be kept from exceeding a desired maximum temperature by injecting vaporizable material into the reaction zone which is in heat exchange relation with the stripping zone.

The stripping gas used in the process of my invention contains not less than about 35% by volume of oxygen. The gas might be oxygen-enriched air and the enriching oxygen might be derived from any known source, such as electrolytic processes. From the economic point of view, I generally select oxygen of not less than 95% purity, produced by the liquefaction and rectification in accordance with the disclosures in the patents to Frankl and Linde. As used in this specification and the appended claims, the term, oxygen of not less than 95% purity, means oxygen containing not more than 5% by volume of atmospheric gases like nitrogen and argon. Where, because of temperature and other limitations in a process, the feed rate of oxygen is not sufficient to fluidize properly the mass of spent catalyst, I may supplement the stripping oxygen with other known stripping gases like steam and the oxides of carbon. When using oxygen of not less than 95% purity, it is advisable to choose as extender steam and/or the oxides of carbon. Steam is readily separated from the stripped hydrocarbons and the combustion products, i. e., carbon monoxide and dioxide, by condensation. The oxides of carbon are, of course, formed by my process of stripping hydrocarbons in the presence of oxygen and, consequently, the recycling of carbon oxides obviates the introduction of extraneous gases into the system. Furthermore, by recycling carbon oxides to extend oxygen of high purity instead of using oxygen-enriched air, the residual gas at the completion of my stripping operation is a mixture of carbon monoxide and dioxide, substantially free of undesirable diluents like nitrogen. In such form, the mixture of carbon oxides is commercially utilizable. Inasmuch as these oxides are formed at temperatures in the vicinity of 1000° F. so as to avoid thermal injury of the catalyst, the mixture has approximately 1 part of carbon monoxide and 2 parts of carbon dioxide. Such a mixture is a convenient fuel having a heating value of about 100 B. t. u. per cubic foot of gas. As hereinbefore mentioned, the carbon oxides may also be utilized in the manufacture of hydrogen and of dry ice or in the synthesis of alcohols and hydrocarbons.

In brief, my invention contemplates a novel process of stripping hydrocarbons from fouled comminuted contact agents through the regulated use of oxygen in relatively high concentration, while maintaining the contact mass in a fluidized condition. The stripping gas, which I introduce into the contact mass, contains not less than about 35% by volume of oxygen. Preferably, I use oxygen of not less than 95% purity and I may extend this oxygen with supplements of steam and/or the oxides of carbon; however, in any case, the composite stripping gas has not less than about 35% by volume of oxygen. I regulate the use of stripping oxygen by the rate of feed or by cooling the stripping zone, or both, in order to prevent thermal deactivation or injury of the catalyst. It is frequently advisable to introduce oxygen into a stripping zone from several spaced points, e. g., at regular intervals along the height of a standpipe. For the particular purposes of my invention, the terms, fluid and fluidized, are not restricted to the highly turbulent motion which is generally observed in the conversion and regeneration zones of fluid catalyst plants, but comprehend the less turbulent states in which a powdered mass still remains free-flowing so that it may be drawn out of a standpipe without fear of packing or clogging. In accordance with the teachings of the art, fluid plants function with powders having a particle size of about 100 to 400 mesh and, in some instances, with powders considerably coarser and finer.

The several benefits arising from the use of oxygen for stripping or displacing hydrocarbons from spent catalysts are all the more surprising when it is realized that the many active investigators in this field have generally avoided the use of even air and have specified the use of inert gases. This is clearly evident in numerous prior patents. I, likewise, find that air with its low concentration of oxygen exerts predominantly an oxidative influence which per se is undesirable. However, with concentrated oxygen, I achieve such unexpected benefits that the limited oxidation is more than counterbalanced.

The foregoing description and examples are intended to be illustrative only. Many modifications of the basic process of my invention will suggest themselves to those skilled in the art, but such variations conforming to the spirit of the invention are to be considered within the scope of the claims.

What I claim is:

1. In hydrocarbon conversion processes wherein hydrocarbons are converted by passage through a fluidized mass of comminuted contact material and wherein said contact material becomes fouled with carbonaceous matter during the conversion and is subjected to regeneration, the improvement of stripping hydrocarbons from fouled contact material through the fluidization of said fouled contact material with oxygen of not less than 95% purity.

2. In the conversion of hydrocarbons in a fluid catalyst plant with bottom draw-off of catalyst from the reactor, the improvement of stripping hydrocarbons from catalyst that is being drawn off, which comprises introducing gas containing not less than about 35% by volume of oxygen into the reactor in the vicinity of the draw-off opening and below the level at which the hydrocarbon feed enters the reactor, permitting said catalyst to flow through the draw-off opening into a standpipe, passing an additional quantity of said gas up through the standpipe, and withdrawing said catalyst from the bottom of the standpipe, while maintaining said catalyst at a temperature below its deactivation temperature.

3. In fluid catalyst processes wherein the hydrocarbon feed and regenerated catalyst enter the reactor in the vicinity of its bottom and a pseudo-liquid level is formed by the fluid catalyst in the upper portion of said reactor, the improvement which comprises draining catalyst from below the pseudo-liquid level into and through a stripping zone of which at least part is in heat exchange relation with said reactor, and passing gas containing not less than about 35% by volume of oxygen up through said stripping zone at a rate sufficient to effect at least partial regeneration of said catalyst, while maintaining said catalyst at a temperature below its deactivation temperature.

4. In the operation of fluid catalyst converters for the conversion of hydrocarbons, the improvement which comprises draining catalyst from a said converter into and through a standpipe, passing gas containing not less than about 35% by volume of oxygen up through said standpipe and into said converter to strip enveloping hydrocarbons from said catalyst exothermically, and controlling the rates of draining said catalyst and passing said gas through said standpipe to effect substantially complete stripping and substantially complete consumption of the oxygen in said gas, while maintaining said catalyst at a temperature below its deactivation temperature.

5. The process of claim 4 wherein the catalyst is maintained at a temperature below its deactivation temperature with the aid of a coolant flowing in indirect heat exchange relation with said catalyst draining through the standpipe.

6. In hydrocarbon conversion processes wherein hydrocarbons are converted by passage through a fluidized mass of comminuted contact material and wherein said contact material becomes fouled with carbonaceous matter during the conversion and is subjected to regeneration, the improvement of stripping hydrocarbons from fouled contact material through the fluidization of said fouled contact material with a composite gas stream made up of oxygen of not less than 95% purity and a gaseous supplement thereto which is predominantly a mixture of carbon oxides, said composite gas stream containing not less than about 35% by volume of oxygen.

7. In hydrocarbon conversion processes wherein hydrocarbons are converted by passage through a fluidized mass of comminuted contact material and wherein said contact material becomes fouled with carbonaceous matter during the conversion and is subjected to regeneration, the improvement of stripping hydrocarbons from fouled contact material through the fluidization of said fouled contact material with a composite gas stream made up of oxygen of not less than 95% purity and a gaseous supplement thereto which is predominantly steam, said composite gas stream containing not less than about 35% by volume of oxygen.

8. In hydrocarbon conversion processes wherein vaporized hydrocarbons are contacted with powdered catalyst under fluidizing and converting conditions and wherein said catalyst becomes spent by the deposition of carbonaceous matter on its surfaces during the conversion and is subjected to regeneration, the improvement of stripping hydrocarbons from said spent catalyst, which comprises contacting said spent catalyst with a composite gas stream made up of oxygen of not less than 95% purity and a gaseous supplement thereto which is predominantly a mixture of carbon oxides, said composite gas stream containing not less than about 35% by volume of oxygen, while maintaining said spent catalyst in a fluidized condition and at a temperature below the deactivation temperature of said catalyst.

9. In hydrocarbon conversion processes wherein vaporized hydrocarbons are contacted with powdered catalyst under fluidizing and converting conditions and wherein said catalyst becomes spent by the deposition of carbonaceous matter on its surfaces during the conversion and is subjected to regeneration, the improvement of stripping hydrocarbons from said spent catalyst, which comprises contacting said spent catalyst with a composite gas stream made up of oxygen of not less than 95% purity and a gaseous supplement thereto which is predominantly steam, said composite gas stream containing not less than about 35% by volume of oxygen, while maintaining said spent catalyst in a fluidized condition and at a temperature below the deactivation temperature of said catalyst.

10. The process of stripping hydrocarbons from comminuted catalyst which becomes fouled in a conversion zone and is revivified in a regeneration zone of a fluid catalyst system, which comprises, during the transfer of the fouled catalyst from the conversion zone to the regeneration zone, passing a composite gas stream made up of oxygen of not less than 95% purity and a gaseous supplement thereto which is predominantly a mixture of carbon oxides, said composite gas stream containing not less than about 35% by volume of oxygen, up through a substantially vertical elongate zone and simultaneously moving fluidized fouled catalyst down through said zone, while maintaining in said zone a temperature below the deactivation temperature of the catalyst but not below about 800° F.

11. The process of stripping hydrocarbons from comminuted catalyst which becomes fouled in a conversion zone and is revivified in a regeneration zone of a fluid catalyst system, which comprises, during the transfer of the fouled catalyst from the conversion zone to the regeneration zone, passing a composite gas stream made up of oxygen of not less than 95% purity and a gaseous supplement thereto which is predominantly steam, said composite gas stream containing not less than about 35% by volume of oxygen, up through a substantially vertical elongate zone and simultaneously moving fluidized fouled catalyst down through said zone, while maintaining in said zone a temperature below the deactivation temperature of the catalyst but not below about 800° F.

PERCIVAL C. KEITH.

REFERENCES CITED

The following references are of record in the file of this patent:

UNITED STATES PATENTS

| Number | Name | Date |
|---|---|---|
| 2,273,076 | Voorhees | Feb. 17, 1942 |
| 2,302,209 | Goddin | Nov. 17, 1942 |
| 2,311,564 | Munday | Feb. 16, 1943 |
| 2,320,273 | Gohr et al. | May 25, 1943 |
| 2,341,193 | Scheineman | Feb. 8, 1944 |
| 2,374,151 | Wolk et al. | Apr. 17, 1945 |
| 2,377,512 | Page | June 5, 1945 |
| 2,378,342 | Voorhees et al. II | June 12, 1945 |
| 2,388,055 | Hemminger | Oct. 30, 1945 |
| 2,391,344 | Nicholson | Dec. 18, 1945 |
| 2,391,434 | McAfee | Dec. 25, 1945 |
| 2,391,944 | Carlsmith | Jan. 1, 1946 |
| 2,394,814 | Snuggs | Feb. 12, 1946 |

FOREIGN PATENTS

| Number | Country | Date |
|---|---|---|
| 543,838 | Great Britain | Mar. 16, 1942 |